(No Model.)
H. J. E. HENNEBUTTE.
PROCESS OF AND APPARATUS FOR RECOVERING GLYCERIN FROM SPENT SOAP LYE.
No. 591,219. Patented Oct. 5, 1897.
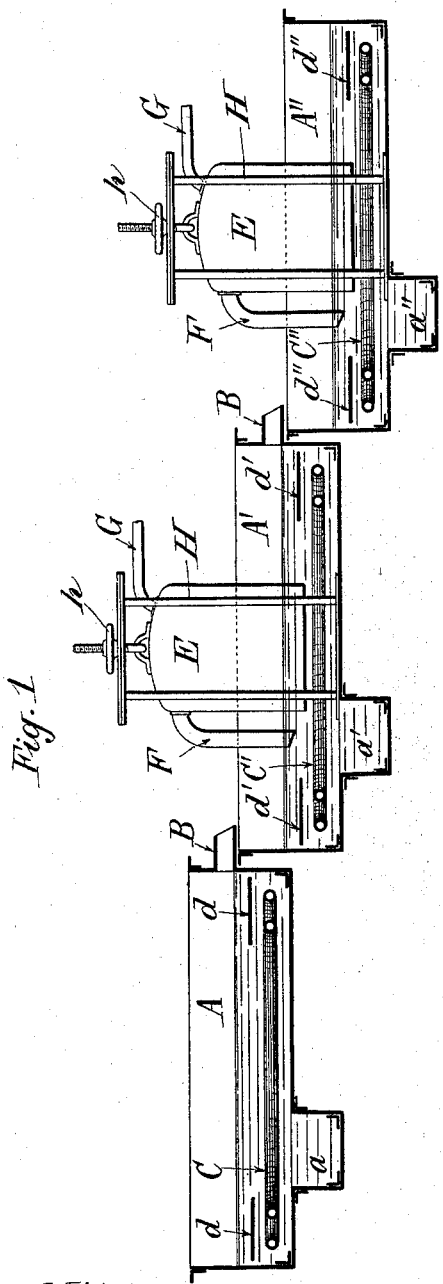
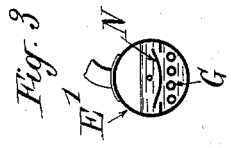
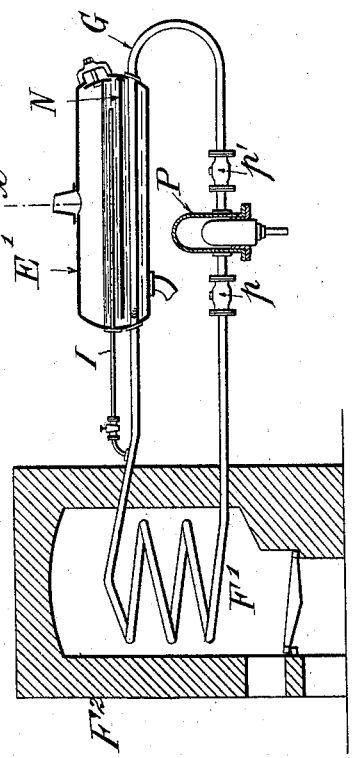
Witnesses:
Inventor:
Henri J. E. Hennebutte
by Henry Cornett
his Attorney

United States Patent Office.

HENRI JOSEPH ERNEST HENNEBUTTE, OF PARIS, FRANCE.

PROCESS OF AND APPARATUS FOR RECOVERING GLYCERIN FROM SPENT SOAP-LYE.

SPECIFICATION forming part of Letters Patent No. 591,219, dated October 5, 1897.

Application filed February 26, 1897. Serial No. 625,084. (No model.) Patented in Belgium April 8, 1896, No. 120,797; in France September 24, 1896, No. 259,968; in Italy September 30, 1896, XXXVI, 42,759, LXXXIII, 496; in Austria October 6, 1896, No. 47/189, and in Spain October 8, 1896, No. 19,761.

*To all whom it may concern:*

Be it known that I, HENRI JOSEPH ERNEST HENNEBUTTE, a citizen of the Republic of France, residing at Paris, France, have invented certain new and useful Improvements in the Recovery of Pure Glycerin from the Lixivium of Soap Factories and the Like, (for which patents have been granted in Belgium, No. 120,797, dated April 8, 1896; in France, No. 259,968, dated September 24, 1896; in Spain, No. 19,761, dated October 8, 1896; in Italy, No. 36/42,759, 83/496, dated September 30, 1896, and in Austria, No. 47/189, dated October 6, 1896,) of which the following is a specification.

The invention relates to the recovery of glycerin in a pure state from liquids containing it, and particularly from the lixivium or lye liquors from soap manufacture.

My mode of recovering the glycerin in an economical manner from the waste liquors containing it comprises three distinct phases, namely: first, previous purification; second, rapid concentration; third, distillation at a constant temperature.

*Previous purification.*—In place of being simply neutralized, as is ordinarily done, the lixivium is first strongly acidified with chlorohydric acid in such a manner that the last traces of soap may be decomposed. After a few hours of rest the fatty acids liberated from the decomposed soap rise to the surface of the lixivium and are removed, preferably by decantation. Then the mixture is made strongly alkaline, not indiscriminately with the aid of any alkali, but with the aid of pure sodium carbonate. Finally, the mixture is neutralized by the addition of calcium chlorid, which causes precipitation of calcium carbonate, this latter taking down with it the impurities. If the calcium carbonate deposited shall include a trace of free alkali, it will form, during the after concentration, a calcareous deposit, which is very prejudicial to the proper progress of the work. The perfect neutralization of the sodium carbonate is therefore very important.

When the liquors treated are found to be charged to an appreciable degree with organic matters, a small percentage of pure aluminium silicate is added with the object of forming a sort of lake, which effects the clarification. The proportion of aluminium silicate required for the clarification is from three to five kilos per one thousand liters of the lixivium treated, varying somewhat according to the amount of impurities present. The liquors thus treated can no longer be emulsified and no longer give place to the formation of an insoluble deposit during their concentration. For proper purification, then, it is necessary, first, to strongly acidify; second, to render the liquor strongly alkaline with very pure sodium carbonate exclusively; third, to neutralize the sodium carbonate with calcium chlorid; fourth, if the liquors are charged to an appreciable extent with organic matter to effect its precipitation with aluminium silicate, the reaction of calcium chlorid on the sodium carbonate yields sodium chlorid, (common salt,) which remains in solution in the liquor.

*Concentration.*—Besides the fact that glycerin is altered and injured by prolonged action of heat thereon the lixivium, containing a very large proportion of sodium chlorid, becomes by concentration an elastic, viscid, and nearly solid mass, from which it is very difficult to separate the salt. Moreover, the deposits on the coils are so abundant and toward the end of the operation are so viscid that the work is effected under very unfavorable conditions. To obviate these serious inconveniences, I adopt the following mode, which permits, first, of protecting the heating-surfaces from adhering deposits; second, of proceeding methodically for the enrichment of the liquor in glycerin and its impoverishment from the salts, whence it follows that, finally, I obtain a solution of glycerin very feebly impregnated with sodium chlorid; third, of renewing continually, by physical means, the surface of the liquid submitted to concentration.

The apparatus employed in carrying out my invention is illustrated in the accompanying drawings, wherein—

Figure 1 is a longitudinal vertical section of the glycerin extractor or concentrator. Fig. 2 is a similar sectional view of the apparatus for distilling or refining the crude glycerin, and Fig. 3 is a cross-section at line $x^3$ in Fig. 2.

Referring first to Fig. 1, this apparatus is composed of three open trays, pans, or vats A A' A'', placed one a little below the other, as shown, the first two being furnished each with an overflow-outlet B. These vats may be of the character of German salt-pans of rectangular form, with bottoms curved or inclined and adapted for heating over an open fire. In this case, however, it is preferred that the vats or pans shall be circular in plan, with level bottoms, and each provided at its bottom with a pocket, as $a$ $a'$ $a''$, where the deposit of salt accumulates; but these vats differ from the German salt-pans in the following respects: They are each furnished with a heating-coil, as C C' C'', protected from the saline deposits by an annular movable plate, as $d$ $d'$ $d''$, arranged above and directly over the coil. Over the center of the vat is suspended an agitator E of bell form, the mouth of which is adapted to be immersed in the liquid in the vat. This bell is suspended in a frame H by means of an adjusting-screw $h$. The bell may be sheet-iron or other metal. The bell E has a plunger-tube F, which taps the bell near the top thereof and depends into the liquid in the vat, but to a less depth than the bell itself. The bell also has a tube G of smaller size than the tube F, and which is adapted to be coupled by a rubber tube with any suitable exhauster or ejector for effecting a partial vacuum within the bell E.

The operation of this device is as follows: When the exhaustion from the bell lowers the level of the liquid in the vat (by its rise in the bell) until it is below the submerged end of the tube F, the air rushes into the bell through said tube and the liquid in the bell falls suddenly, thus producing great agitation of the liquid in the vat. This operation will of course be repeated automatically and with a frequency due to the rapidity with which the ejector acts. The operation will also be repeated with great regularity and will be found a great aid to the evaporation. The liquid first enters the vat A and passes thence successively to the others, being submitted therein to the effects of the heat in relatively thin sheets.

The salts deposited in the last vat of the series are caught in the pocket $a''$ of this vat, to be afterward washed on a sieve and the washing liquor put into the next vat above, since in this vat the liquor is less dense. As to the salts of the intermediate vats it will be understood that it is in the vat next above that the washings from the salt are to go. From this mode of washing in liquors saturated with salt, and in consequence not able to dissolve any more, it follows that the proportion of the glycerin is continually augmented, while the amount of sodium chlorid decreases proportionately. Under these conditions the work proceeds without difficulty.

*Distillation, having in view the refining of the crude concentrated glycerin.*—This is effected in a vacuum in a metal cylinder preferably arranged with its axis horizontal. The apparatus is illustrated in Figs. 2 and 3. The cylinder E', in which the distillation is effected, has a false bottom N, which serves to isolate the greater part of the contained salts. Within the cylinder E' and below the false bottom N is a flat heating-coil G, connected with and forming part of a coil F' in a furnace F². The coil F', containing steam, serves to generate superheated steam, while that part G in the cylinder or still E' exchanges caloric with the glycerin in which it is submerged.

P is a pump for effecting circulation through coils, the valves $p$ and $p'$ being the induction and eduction valves. It follows that in principle, and save for some loss, compensated by a generator, the same steam serves as a vehicle for successively withdrawing the complementary caloric from the furnace and for its transmission to the liquids to be distilled. Under these conditions the employment of superheated steam by a coil becomes practical and economical and secures the possibility of regulating the temperature of the mass being distilled in an invariable manner. In addition to heating with the coil G the superheated steam is led into the mass of glycerin in the cylinder from the coil F' through a slender perforated tube I.

Having thus described my invention, I claim—

1. The herein-described method of purifying liquors containing glycerin, which consists in first decomposing the soap that may exist therein with acid, then removing the fatty acids, then adding to the liquor sodium carbonate in quantity sufficient to render the liquor strongly alkaline, and then neutralizing the liquor by the addition of calcium chlorid, substantially as and for the purposes set forth.

2. The herein-described method of purifying liquors containing glycerin, which consists in first decomposing the soap that may exist therein with acid, then removing the fatty acids, then adding to the liquor sodium carbonate in quantity sufficient to render the liquor strongly alkaline, then neutralizing the liquor by the addition of calcium chlorid, and finally adding a small quantity of pure aluminium silicate for freeing the liquor of organic matter, substantially as and for the purposes set forth.

3. The herein-described method of treating soap liquors for the recovery of glycerin contained therein, which consists in first decomposing with acid the soap that may exist therein, then removing the fatty acids, then adding to the liquor sodium carbonate in quantity to render the same strongly alkaline, then neutralizing the liquor with calcium chlorid, then concentrating the liquor and removing the major portion of the salts therefrom, and finally distilling the crude glycerin, substantially as set forth.

4. The concentrating apparatus herein described, the same comprising the series of vats A, A' and A'', provided with heating-coils C, C' and C'', the movable, annular plates d, d', d'', over the respective coils, the pockets a, a', a'', in the bottoms of the respective vats, and agitators in the vats, substantially as set forth.

5. The combination with the vat, of an intermittently-operating agitator, comprising a suspended bell, the mouth of which is adapted to be submerged in the liquor in the vat, the sealing pipe or tube F, connecting with the upper part of said bell and depending to a less extent than the bell, and an outlet from the top of the bell for the constant exhaust of the air therefrom, substantially as set forth.

6. The apparatus for distilling the crude glycerin, which comprises a cylinder E', a furnace, the connected coils F' and G, the former in the furnace and the latter in the said cylinder, the circulating-pump in connection with said coils, the false bottom N, in the cylinder above the coils G, and the slender pipe I, connected at one end with the coil-pipe and extending into the cylinder, for supplying superheated steam to the mass of crude glycerin therein, substantially as set forth.

In witness whereof I have hereunto signed my name in the presence of two subscribing witnesses.

HENRI JOSEPH ERNEST HENNEBUTTE.

Witnesses:
JULES ARMENGAUD, Jeune,
EDWARD P. MACLEAN.